July 12, 1932.   L. GELBMAN   1,867,144
CONCRETE MOLDING MACHINE
Filed Jan. 24, 1930   2 Sheets-Sheet 2

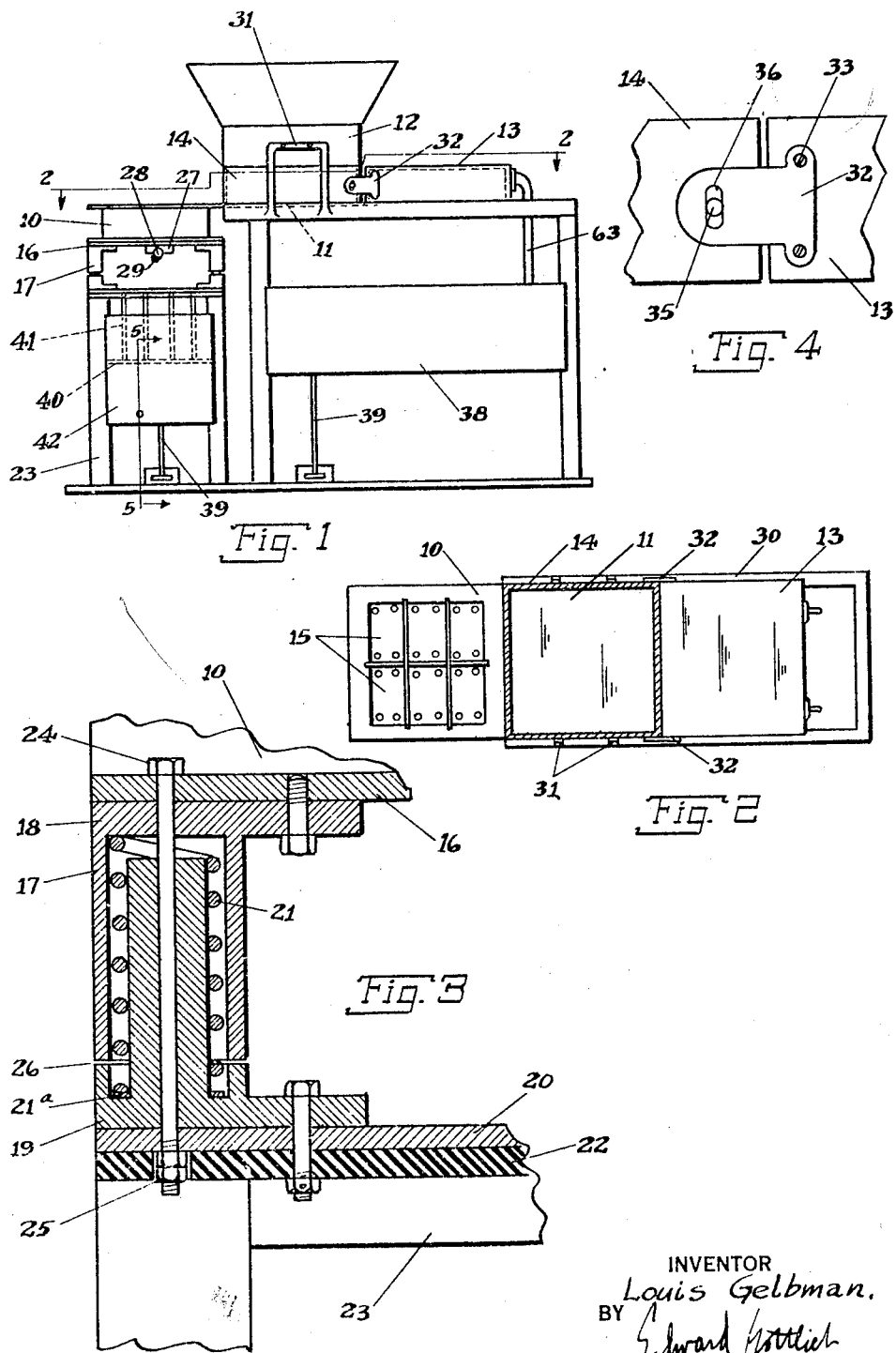

INVENTOR
Louis Gelbman.
BY
Edward Gottlieb
ATTORNEY

Patented July 12, 1932

1,867,144

UNITED STATES PATENT OFFICE

LOUIS GELBMAN, OF YONKERS, NEW YORK

CONCRETE MOLDING MACHINE

Application filed January 24, 1930. Serial No. 422,984.

This invention relates to new and useful improvements in a concrete molding machine.

This invention relates to similar subject matter to that disclosed in my copending application, Serial No. 325,673 filed on December 13th, 1928.

The time necessary to vibrate the mold of a concrete molding machine to change the consistency of the material from an initial consistency capable of slow sagging into the mold into a consistency capable of being immediately stripped from the mold without sagging depends upon the application and type of the vibrations. Further, the proper type and application of the vibrations makes it possible to use a leaner cement ratio in the concrete and obtain a good building block and or other concrete or the like product. The reducing of the vibrating time and the use of a leaner cement ratio reduces the cost of manufacture of the blocks.

The invention has for an object the provision of a concrete molding machine which is of simple durable construction, dependable in use and exceedingly efficient in action, and which can be manufactured and sold at a reasonable cost.

For obtaining the above advantages, the invention proposes a resiliently supported mold, means for limiting the amplitude of possible motion of the mold, and means for vibrating said mold thru an amplitude larger than said limiting amplitude so that jolting of the mold occurs.

The invention also proposes a method for packing the mold of a machine of the class mentioned which consists primarily in jolting the mold with applied external forces, and particularly by allowing the force to move the mold and then suddenly arresting the motion.

The invention also proposes a plate stationarily supported in edge contacting relation with the top of said mold, a feed hopper above said plate, a cut off slide for said hopper, a feed drawer between said plate and hopper and resting upon said plate and loosely connected with said slide so that when moved upon said mold not to restrain jolting.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a side elevational view of a machine constructed according to this invention.

Fig. 2 is a horizontal sectional view taken on the line 2—2 of Fig. 1.

Fig. 3 is an enlarged fragmentary detailed view of a portion of Fig. 1 shown in section.

Fig. 4 is a fragmentary enlarged detailed view of another portion of Fig. 1.

Figure 5:
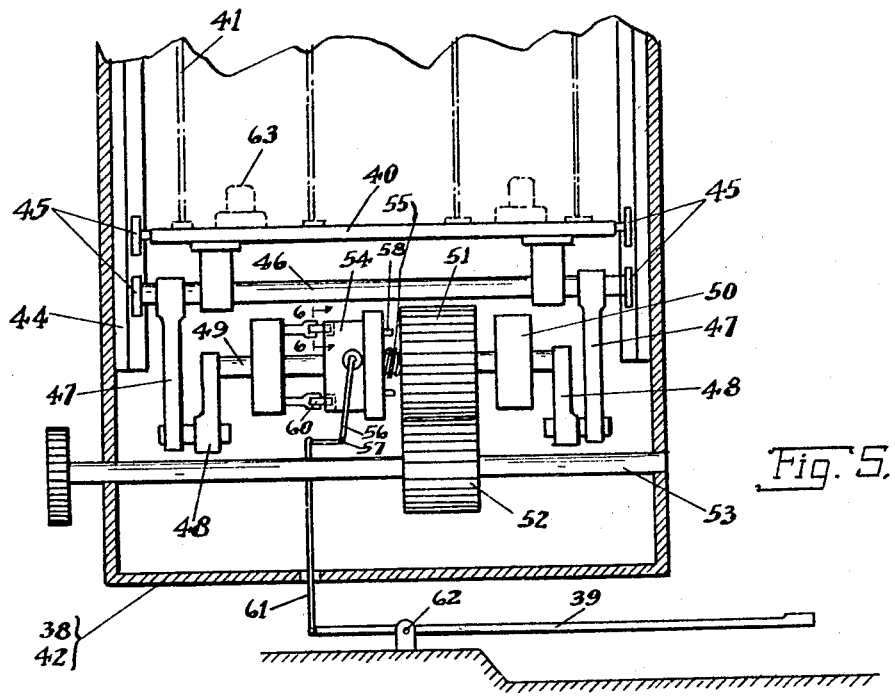
Fig. 5 is a fragmentary enlarged vertical sectional view taken on the line 5—5 of Fig. 1.
Figure 6:
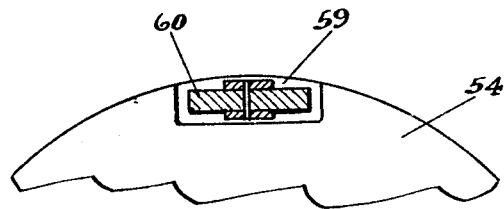
Fig. 6 is a fragmentary enlarged sectional view taken on the line 6—6 of Fig. 5.

The concrete molding machine is provided with a resiliently supported mold 10, means for limiting the amplitude of possible motion of said mold, and means for vibrating said mold thru an amplitude larger than said limiting amplitude so that jolting of the mold occurs. A plate 11 is stationarily supported in edge contacting relation with the top of the mold 10 beneath a feed hopper 12 provided with a cut off slide 13, a feed drawer 14 being between said plate 11 and the hopper 12 and resting upon the plate 11 and loosely connected with said slide 13 so that when moved upon said mold 10 not to restrain jolting, and means being provided for moving said slide to close the bottom of the hopper and simultaneously moving the drawer upon said mold.

The mold 10 is shown divided into six block compartments 15. It is shown attached upon a jolt plate 16. The means for resiliently supporting the mold consists of four corner brackets 17 beneath each of the corners of the jolt plate 16 and each corner bracket comprises a top tubular section 18 attached upon the bottom of the jolt plate, a bottom tubular section 19 attached upon a support plate 20 and an expansion spring 21 within an annular space between said sections 18 and 19. The support plate 20 rests upon a rubber sheet 22 and is attached upon a frame 23.

The means for limiting the outward amplitude of possible motion of the mold 10 consists of a bolt 24 extended thru each of the bracket sections 18 and 19 and provided with adjustment nuts 25 so that the bracket sections 18 and 19 may be held in spaced positions thereby. Engagement of the sections against each other constitutes the means of limiting the inward amplitude of possible motion of the mold. The clearance between the bracket sections is indicated by reference numeral 26.

The nuts 25 may be adjusted for changing the clearance 26 so as to obtain the best jolting results. The expansion spring 21 acts to maintain the clearances 26. Means may be provided for changing the tension of the spring 21, such as washers 21ª shimmed outside of one end of the spring. The means for vibrating said mold thru an amplitude larger than said limiting amplitude so that jolting of the mold occurs consists of pillar blocks 27 attached upon the bottom of the jolt plate 16 and rotatively supporting a driver shaft 28 carrying offset weights 29.

The said plate 11 is supported by a frame 30. Braces 31 project from this frame and support the hopper 12. The feed drawer 14 is open at the top and bottom and closed at the sides and is a snug fit between the bottom of the hopper and the plate 11 so that material from the hopper may enter therein. The cut off slide 13 is slidably mounted upon the top of the frame 30 and at the sides is provided with connection brackets 32 fixedly held in place by screws 33. A portion of the connection brackets extend over the feed drawer 14 and pegs 35 project from the feed drawer into slots 36 in the brackets 32 permitting the mold 10 to vibrate without any restraint when the feed drawer is engaged over the mold.

The means for moving the slide 13 to close the bottom of the hopper and simultaneously moving the drawer 14 upon the mold, is housed within a casing 38 supported upon the frame 30. This means is provided with a foot pedal 39 adapted upon depression to set off an alternate stroke in one direction and in the other. Arms 63 connect the means to transmit the stroke to the slide 13 and are attached upon a plate 40 having rollers 45 engaging guides 44. Pallets not shown on the drawing are provided for each of the mold compartments and dropped therein before the feed drawer 14 is moved over the mold to deliver material to the mold. After the drawer is moved from over the mold, stripping of the blocks is necessary and this is accomplished by the plate 40 being provided with stripper rods 41, and a means within a casing 42 to alternately move the rods upwards and downwards upon the operation of a foot pedal 39.

The means within the casings 38 and 42 is shown in detail in Fig. 5, and consists of a pair of guides 44 within the casing and receiving rollers 45 upon a transverse rod 46 and upon said plate 40 which is tied to said rod 46. Throw arms 47 connect with the rod 46 and with crank arms 48 mounted upon a shaft 49. Pillar blocks 50 are mounted upon the casing and rotatively support the shaft 49. A gear 51 is loosely mounted upon the shaft 49 and meshes with a driver gear 52 upon a driver shaft 53. A clutch jaw 54 is slidably mounted upon the shaft 49 and is keyed to the shaft in some suitable fashion so as to rotate therewith. An expansion spring 55 acts between the gear 51 and the clutch jaw for normally separating these elements.

A fork 56 is pivotally mounted at 57 upon the casing and is adapted to move the clutch jaw 54 into engagement with the gear 51. For this purpose the jaw is provided with pegs 58 engageable in apertures in the side of the gear. The rear of the clutch jaw 54 is formed with a pair of diametrically opposite slots 59 adapted to receive a pair of rollers 60 rotatively mounted upon arms fixed upon one of the pillar blocks 50. A rod 61 connects with the fork member 56 and with the said foot pedal 39 which is pivotally mounted intermediate of its ends as at 62.

In operation, a concrete mixture is supplied to the hopper 12 and drops within the feed drawer 14 and rests on plate 11. The operator of the machine drops pallets within the mold compartments 15 and then steps upon the foot pedal 39 of the means within the casing 38. This causes the fork 56 to move the clutch jaw 54 into engagement with the gear 51. The spring 55 is restrained from moving the clutch jaw out of engagement since the clutch jaw immediately slightly rotates so that the rollers 60 ride past the slots 59. Rotations from gear 51 are now transmitted to the shaft 49, the throw arms 47 and thence to the arms 63 which are connected with the slide 13 and move the slide so as to cut off the supply of material from the hopper 12 simultaneously moving the feed drawer 14 upon the top of the mold 10. After a 180 degree rotation of the shaft 49 the rollers 60 ride into the slots 59 so that the spring 55 moves the clutch out of engagement and thus stops the feed drawer over the mold.

The vibrator 27, 28, 29 is next set into operation by engagement of a clutch and firmly packs the mold. This is particularly accomplished by jolting since as the mold 10 vibrates upwards and downwards, and is suddenly arrested in alternate strokes by the bolts 24 and in the remaining strokes by collision of the bracket sections 18 and 19. The sudden stop in each direction produces a sudden violent jerk which shakes water out of the concrete mixture and changes its consistency so that subsequent stripping is immediately possible. The operator next stops the vibrator and steps upon the pedal 39 of the means in casing 42 so as to cause the plate 40 to raise and move the stripper rods 41 to lift the blocks. The blocks are then removed and the pedal 39 of the means 42 depressed to lower the stripper rods. Then the operator steps upon the foot pedal 39 of the means within the casing 38 to cause the clutch of this means to engage the gear and transmit motion from the driver shaft 53 to the arms 63 to move the feed drawer to its original position. The cycle is then repeated.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. In a concrete molding machine, a resiliently supported mold, means for limiting the amplitude of possible motion of the mold, means for vibrating said mold and normally tending, without said limiting means, to vibrate molds of larger amplitudes, and said limiting means stopping the mold on each stroke of vibration.

2. In a concrete molding machine, a resiliently supported mold, means for limiting the amplitude of possible motion of the mold, means for vibrating said mold and normally tending, without said limiting means, to vibrate molds of larger amplitudes, and said limiting means stopping the mold on each stroke of vibration, said means for limiting the amplitude of possible motion of the mold consists of bolts extended thru bracket sections resiliently urged apart and interposed between a support frame and the mold, and adjustment screws upon the said bolts.

3. In a concrete molding machine, a resiliently supported mold, means for limiting the amplitude of possible motion of the mold, means for vibrating said mold and normally tending, without said limiting means, to vibrate molds of larger amplitudes, and said limiting means stopping the mold on each stroke of vibration, the resilient supporting of the mold being accomplished by a plurality of brackets interposed between a support frame and the mold and each bracket consisting of a stop section connected with the mold, a bottom section connected with the support frame, and a spring urging the sections apart.

4. In a concrete molding machine, a resiliently supported mold, means for limiting the amplitude of possible motion of the mold, means for vibrating said mold and normally tending, without said limiting means, to vibrate molds, of larger amplitudes, and said limiting means stopping the mold on each stroke of vibration, the resilient supporting of the mold being accomplished by a plurality of brackets interposed between a support frame and the mold and each bracket consisting of a top section connected with the mold, a bottom section connected with the support frame, and a spring urging the sections apart, said bracket sections being tubular and interengaged with each other to provide an annular space for the reception of said spring.

5. In a concrete molding machine, a resiliently supported mold, means for limiting the amplitude of possible motion of the mold, means for vibrating said mold and normally tending, without said limiting means, to vibrate molds of larger amplitudes, and said limiting means stopping the mold on each stroke of vibration, comprising pillar blocks supported on the mold and rotatively supporting a driver shaft carrying offset weights.

6. In a concrete molding machine, a resiliently supported mold, means for limiting the amplitude of possible motion of the mold, means for vibrating said mold and normally tending, without said limiting means, to vibrate molds of larger amplitudes, and said limiting means stopping the mold on each stroke of vibration, a plate stationarily supported in edge contacting relation with the top of said mold, a feed hopper above said plate, a cut off slide for said hopper, a feed drawer between said plate and hopper and resting on said plate and loosely connected on the said slide so that when moved upon said mold not to restrain jolting, and means for moving said slide to close the bottom of the hopper and simultaneously moving the drawer upon said mold.

7. In a concrete molding machine, a resiliently supported mold, means for limiting the amplitude of possible motion of the mold, means for vibrating said mold and normally tending, without said limiting means, to vibrate molds of larger amplitudes, and said limiting means stopping the mold on each stroke of vibration, a plate stationarily supported in edge contacting relation with the top of said mold, a feed hopper above said plate, a cut off slide for said hopper, a feed drawer between said plate and hopper and resting on said plate and loosely connected on the said slide so that when moved upon said mold not to restrain jolting, and means for moving said slide to close the bottom of the hopper and simultaneously moving the drawer upon said mold, brackets being attached upon the sides of said slide and extending across said feed drawer, and pegs projecting from the feed drawer and engaging in slots in the bracket for accomplishing the said loose connection between the slide and the drawer.

8. In a concrete molding machine, a resiliently supported mold, means for limiting the amplitude of possible motion of the mold, means for vibrating said mold and normally tending, without said limiting means, to vibrate molds of larger amplitudes, and said limiting means stopping the mold on each stroke of vibration, and a feed drawer for moving over said mold and supplying concrete to the mold and supported to vibrate with the mold so as not to restrain vibrations.

9. In a concrete molding machine, a resiliently supported mold, means for limiting the amplitude of possible motion of the mold, means for vibrating said mold and normally tending, without said limiting means, to vibrate molds of larger amplitudes, and said limiting means stopping the mold on each stroke of vibration, and means for adjusting the resilience of said mold supporting.

10. In a concrete molding machine, a resiliently supported mold, means for limiting the amplitude of possible motion of the mold, means for vibrating said mold and normally tending, without said limiting means, to vibrate molds of larger amplitudes, and said limiting means stopping the mold on each stroke of vibration, the resilient supporting of the mold being accomplished by a plurality of brackets interposed between a support frame and the mold and each bracket consisting of a top section connected with the mold, a bottom section connected with the support frame, a spring urging the sections apart, and means for adjusting the tension of said spring.

11. In a concrete molding machine, a resiliently supported mold, means for limiting the amplitude of possible motion of the mold, means for vibrating said mold and normally tending, without said limiting means, to vibrate molds of larger amplitudes, and said limiting means stopping the mold on each stroke of vibration, the resilient supporting of the mold being accomplished by a plurality of brackets interposed between a support frame and the mold and each bracket consisting of a top section connected with the mold, a bottom section connected with the support frame, a spring urging the sections apart, and means for adjusting the tension of said spring, comprising washers shimmed outide of the ends of said spring.

12. A method for packing the mold of a machine of the class described, consisting in vibrating the mold vertically, and abruptly stopping each stroke of the vibration at the top and at the bottom.

13. A method of packing the mold of a machine of the class described, consisting in moving the mold with external applied forces thru a vertical reciprocating path, and suddenly stopping at the top and at the bottom each stroke of reciprocation before it ends.

14. A method of packing the mold of a machine of the class described, consisting in resiliently supporting the mold, moving the mold with external forces thru a vertical oscillating path, and abruptly stopping each stroke of oscillation at the top and at the bottom before its natural end.

Signed at New York, in the county of New York and State of New York, this 13th day of January, A. D. 1930.

LOUIS GELBMAN.

DISCLAIMER 1,867,144.—*Louis Gelbman*, Yonkers, N. Y. CONCRETE MOLDING MACHINE. Patent dated July 12, 1932. Disclaimer filed December 4, 1943, by the inventor, and the assignee of part interest, *Hamlin F. Andrus*.

Hereby enter this disclaimer to claims 12 and 13 of said patent.

[*Official Gazette December 28, 1943.*]